(12) United States Patent
Montpetit

(10) Patent No.: US 6,830,062 B2
(45) Date of Patent: Dec. 14, 2004

(54) SPIGOT FREEZE DRIPPER

(76) Inventor: John R. Montpetit, 365 N.W. 3rd St., Lake Butler, FL (US) 32054

( * ) Notice: Subject to any disclaimer, the term of this patent is extended or adjusted under 35 U.S.C. 154(b) by 0 days.

(21) Appl. No.: 10/260,897

(22) Filed: Sep. 30, 2002

(65) Prior Publication Data
US 2004/0060594 A1 Apr. 1, 2004

(51) Int. Cl.⁷ .......................... F16K 21/02; F16K 47/14; B05B 1/30; F15D 1/02
(52) U.S. Cl. .......................... 137/59; 137/504; 137/550; 137/861; 137/883; 137/887; 138/32; 138/41; 138/43; 138/46; 239/533.13; 239/553.3; 239/553.5; 239/562; 239/570; 239/575; 239/581.1; 239/590.3; 239/590.5; 239/DIG. 23; 251/118
(58) Field of Search .............................. 137/59, 60, 61, 137/62, 301, 302, 801, 861, 883, 887, 549, 550; 138/41, 42, 44, 32, 43, 45, 46; 239/75, 104, 121, 462, 548, 551, 562, 570, 575, 581.1, 25, 29, 533.13, 542, 553, 553.3, 553.5, 590, 590.3, 590.5, DIG. 23; 210/418, 429, 435; 251/118, 127

(56) References Cited

U.S. PATENT DOCUMENTS

| 1,883,720 | A | * | 10/1932 | Grimes | 138/41 |
| 3,138,332 | A | * | 6/1964 | Hinderer | 239/590.3 |
| 3,369,556 | A | | 2/1968 | Allderdice | 137/62 |
| 3,380,464 | A | | 4/1968 | Arterbury et al. | 137/62 |
| 3,446,226 | A | | 5/1969 | Canterbury | 137/62 |
| 3,630,444 | A | * | 12/1971 | Nelson | 239/590.3 |
| 3,630,455 | A | * | 12/1971 | Parkison | 239/590.3 |
| 3,697,002 | A | * | 10/1972 | Parkison | 239/590.3 |
| 4,022,244 | A | * | 5/1977 | Oman | 137/517 |
| 4,105,162 | A | * | 8/1978 | Drori | 239/542 |
| 4,205,698 | A | * | 6/1980 | Hucks | 137/62 |
| 4,266,576 | A | * | 5/1981 | Bradford | 138/41 |
| 4,437,481 | A | | 3/1984 | Chamberlin et al. | 137/62 |
| 4,638,828 | A | | 1/1987 | Barrineau, Sr. et al. | 137/62 |
| 4,667,349 | A | * | 5/1987 | Son | 137/801 |
| 4,700,732 | A | * | 10/1987 | Francisco | 137/801 |
| 4,809,727 | A | * | 3/1989 | Chamberlin | 137/62 |
| 4,852,601 | A | * | 8/1989 | Chamberlin | 137/62 |
| 5,065,786 | A | | 11/1991 | Rozenblatt | 137/202 |
| 5,715,855 | A | * | 2/1998 | Bennett | 137/62 |
| 5,797,416 | A | | 8/1998 | Wilcox | 137/60 |
| 6,158,455 | A | * | 12/2000 | Marshall et al. | 137/59 |

OTHER PUBLICATIONS

Mister Landscaper, bubble pak card for MLD–PC1.
Mister Landscaper, web site for drip products; MLD–PC1.
The Drip Store, web site product information; LF003.

* cited by examiner

Primary Examiner—George L. Walton
(74) Attorney, Agent, or Firm—Authur G. Yeager

(57) ABSTRACT

A dripper apparatus for a water spigot includes a coupler having a threaded female member for connecting to a water spigot. A generally cylindrical elongate member has a longitudinal portion in fluid communication with the female member. The longitudinal portion has an upper portion that defines a seat within the female member. A flow controller sits on the seat. A filter screen upstream the flow controller collects particles in water flowing therethrough so that the controller does not become clogged. The flow controller includes a housing that is provided with an upper inlet for receiving a first flow rate of water from a water spigot. The housing also includes a cavity therewithin and the cavity is in fluid contact with the upper inlet. A flexible membrane is housed within the cavity and floats when water enters the cavity via the upper inlet. The upper inlet is slotted at the top thereof for further filtering water flowing therethrough. When the flexible membrane floats within the cavity, sufficient water is allowed to flow therethrough for preventing the water from freezing. A generally cylindrical lower outlet is in fluid contact with the cavity for receiving and discharging a second flow rate of water therefrom which is substantially equal to the first flow rate of water entering the upper inlet.

20 Claims, 3 Drawing Sheets

SPIGOT FREEZE DRIPPER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a dripper device for a water spigot and, more particularly, to a dripper device including a flow controller housing a flexible membrane allowing a minimal amount of water to flow therethrough for preventing water pipes from freezing during low temperatures.

2. Prior Art

Cold climates can cause severe damage to water pipes. When water in pipes freezes, it can cause the pipes to rupture. Such a rupture can damage the interiors of homes especially in areas where severe freezing is sufficiently infrequent that plumbing design does not include adequate thermal protection. Exterior faucets or water spigots are especially susceptible to such freezing, though, such freezing is by no means limited to exposed water spigots and can occur in any unprotected water pipe when ambient temperatures drop to 32 degrees Fahrenheit and below.

Many freeze protection devices have been developed but employ complicated temperature-actuated and/or air pressure-actuated mechanical parts, for example, that are susceptible to fatigue over time. Such devices proposed during previous years can be divided into two different main categories: (1) attempting to keep the temperature of the water in the pipe above freezing point, and (2) keeping the water in the pipe moving.

Attempts in accordance with the first category have included different ways of insulating the pipes. Such proposals have increased material and installation costs and have not given satisfactory results.

Attempts according to the second category have included an old, well-tried method of keeping a water spigot open during the winter. Unfortunately, unless the water flow is controlled, keeping the water spigot open has the disadvantage of increasing water consumption considerably. It is difficult to set the water spigot open sufficiently to be sure that the water does not freeze in the pipes and a homeowner must be aware of an oncoming freezing period to remember to open and close the valve(s). Consequently, if the homeowner is away from home when the freezing occurs or if the home is a vacation home in an area where freezing is normally unexpected, manually turning the water spigot on/off for freeze protection must be done by a neighbor.

An example of a previous device that prevents water pipes from freezing by maintaining a constant flow of water through the pipes is U.S. Pat. No. 5,065,786 to Rozenblatt. Rozenblatt discloses a water flow control valve housing a cylindrical valve member axially slidable between an open and closed position. When the supply line is pressurized, a float in the bore of the valve member moves against a seat in the valve member to stop the flow of water inside the valve. Likewise, when the supply line is depressurized, the float moves away from the valve member seat due to gravity to permit draining of the supply line.

U.S. Pat. No. 4,638,828 to Barrineau Sr., et al. discloses an automatically operated valve to prevent freezing of water lines. The water faucet has female threads to accommodate a drip valve, which is threaded into a standard "tee" type plumbing fitting. The drip valve includes an elongated housing having a temperature-monitoring device within its upper portion and a moveable tip at its lower portion. When water temperature falls to freezing levels, a wax-like substance in the upper portion of the device contracts, causing the tip to reflex and allows water to flow through an opening at the bottom of the device.

U.S. Pat. No. 4,437,481 to Chamberlin et al. discloses a self-actuating drip valve housing a valve seat that moves towards the faucet when the device is in use. A valve stem, having a valve tip, is secured to a base plate situated between concentric extendable walls that extend along the housing. The valve stem extends within the extendable walls and the base plate may be adjusted for moving the valve stem relative to the valve seat.

Other examples of anti-freeze devices that use sensitive mechanical parts to maintain the flow of water in pipes are disclosed in U.S. Pat. Nos. 3,446,226 to Canterbury; 3,369,556 to Allderdice; 3,380,464 to Arterbury et al.; and 3,618,625 to Walters.

None of the above-mentioned prior art devices can be considered safe from mechanical failure before onset of freezing weather. For example, devices requiring adjustment to set the temperature of actuation are subject to wrong settings or to change of settings caused by movement in the mechanism. Other devices containing an actuation chamber filled with water or another expansible substance can be subject to undetected leakage through o-rings, seals, or threads, and consequently will fail to open during sub-freezing conditions. If such failure occurs, the condition will not be visible in these devices until after the freeze has been followed by a thaw.

Accordingly, there is a need for a failure-safe freeze prevention device that does not require the homeowner to repeatedly adjust the water spigot on and/or off to regulate the flow as temperature conditions change. As set forth below, the solution to the problem has been achieved by using a few simple and reliable components that function without the need for movable mechanical parts or the need to repeatedly adjust the flow of the water spigot during freezing weather. The present invention can be used with several other different water outlets such as a "Y" or two-way water spigot connector and a male end of a standard water hose, for example.

BRIEF SUMMARY OF THE INVENTION

In view of the foregoing background, it is therefore an object of the invention to provide a dripper device including few moving parts for water spigots. These and other objects, features, and advantages of the invention, are provided by a dripper apparatus for a water spigot including a coupler, which includes a threaded female member for connecting to a water spigot, and defining a first axial bore. A generally cylindrical elongate member has a longitudinal portion defining a second axial bore in fluid communication with the first axial bore. The elongate member also has an upper portion with a diameter smaller than a diameter of the first axial bore so that the upper portion defines a seat within the first axial bore.

A flow controller is in the first axial bore seated on the seat and maintained in the upper portion, and a filter screen is also in the first axial bore positioned upstream of the controller. The filter screen collects particles in water flowing therethrough so that the controller does not become clogged. The filter screen includes a washer attached around a lower end thereof against which a spigot is removably sealed.

The female member includes a lower lip and the elongate member has a first groove extending around an outer surface of the upper portion for receiving the lip so that the female member may rotate about the groove. The longitudinal portion further includes a lower portion that has a generally equal diameter to the upper portion. The lower and upper portions are connected via a mid-portion having a larger diameter than the diameters of the upper and lower portions and for forming first and second spaced shoulders adjacent respective top and bottom ends of the mid-portion. The lower portion further includes an angular or annular shoulder adjacent its lower free end to help secure a poly-drip hose so that water can be directed away from the controller.

The flow controller includes a housing, an upper inlet for receiving a first flow rate of water from a spigot, a cavity defined within the housing and in fluid contact with the upper inlet, a flexible membrane housed within the cavity for regulating the first flow rate of water, and a lower outlet in fluid contact with the cavity for receiving and discharging a second flow rate of water therefrom which is substantially equal to a first flow rate of water entering the upper inlet. The flow controller has a diameter larger than the diameter of the upper portion of the longitudinal portion so that the controller remains within the female section.

The cavity has an upper portion and a lower portion in fluid communication therebetween with the flexible membrane being disposed between the upper and lower portions of the cavity. The flexible membrane has a generally circular shape and a diameter that is smaller than a diameter of the cavity. Such a flexible membrane may be formed of a rubber-like material, for example.

The lower portion includes a plurality of protrusions extending upward from a lower surface thereof, the plurality of protrusions being spaced apart and causing the flexible membrane to float when water enters the cavity via the upper inlet.

The housing includes an upwardly extending tube with its upper end defining the upper inlet. The upwardly extending tube is positioned generally centrally of the upper portion and is generally cylindrical. The housing includes a downwardly extending tube with its lower end defining the lower outlet. The downwardly extending tube is positioned generally at a perimeter of the lower portion and is also generally cylindrical. The upper inlet and the lower outlet each define a slotted opening, which may serve as a secondary filter. The opening at the lower inlet is substantially perpendicular to the lower portion of the cavity while the opening at the upper inlet is angled to the upper portion of the cavity.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout, and prime notations are used to indicate similar elements in alternate embodiments.

Figure 1:
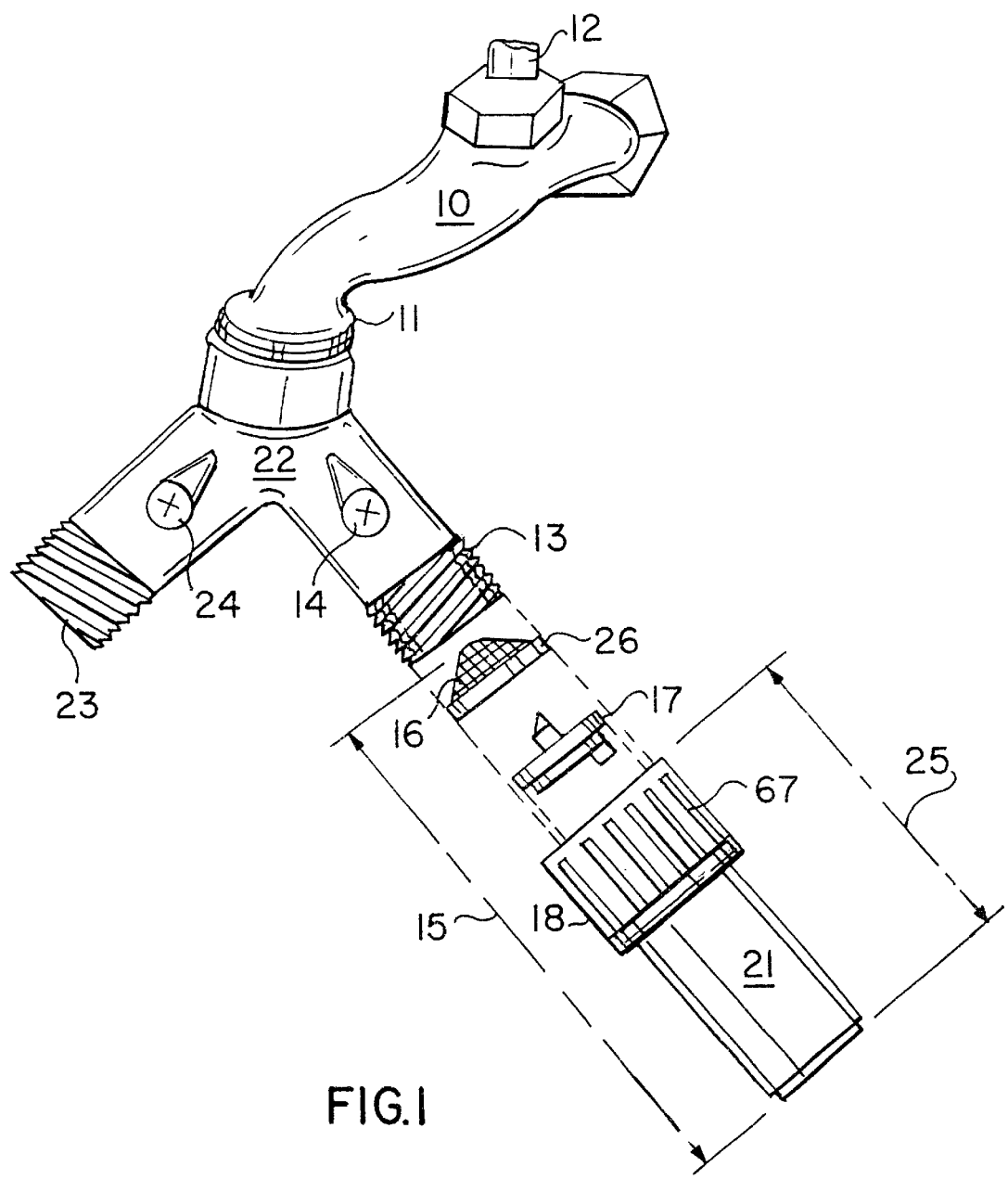
FIG. 1 is an exploded perspective view of a dripper device attachable to a water spigot via a "Y" or two-way water spigot connector hereinafter referred to as a "y-connector", in accordance with the present invention.

Referring initially to FIG. 1, a water spigot 10 is provided with external threads 11 to which a y-connecter 22 can be attached. Valve handle 12 opens and closes the water spigot 10 to control the flow of water therefrom. The two-way y-connector 22 has a pair of ball cut-off valves 14, 24 for controlling the water flow to either leg of the y-connector and, hence, to a dripper device 15. Such a dripper device can be fitted on any standard water supply male end connector such as water spigot 10 male end 11, y-connector 22 male ends 13, 23 and/or any standard water hose male end, for example, all of which are hereinafter referred to as the male end. Internal threads 27 (as perhaps best shown in FIG. 2) line the interior of female member 18. Such threads mate with male threads 13 of y-connector 22, which serve to attach the coupler 15 to the water spigot 10.

Dripper device 15 includes coupler 25, which includes female member 18 and elongate member 21. A plurality of bars 67 are attached to the outer surface of female member 18 and such bars 67 extend vertically therealong. The plurality of bars 67 helps an operator maintain a secure grip around female member 18 when turning same.

A flow controller 17 (discussed below) rests within a cavity of the female member 18. A filter screen 16 having a generally conical shape fits within female member 18. As water flows from the spigot 10 into the coupler 25, foreign particles in the water, such as sand and scale, may become lodged in flow controller 17 thereby preventing water flow. This could result in the freezing of spigot 10 with subsequent rupture of the water pipe and the spigot. To prevent this, filter screen 16 is attached to annular gasket or washer 26 and positioned upstream of the flow controller 17 for blocking such foreign particles.

Figure 2:
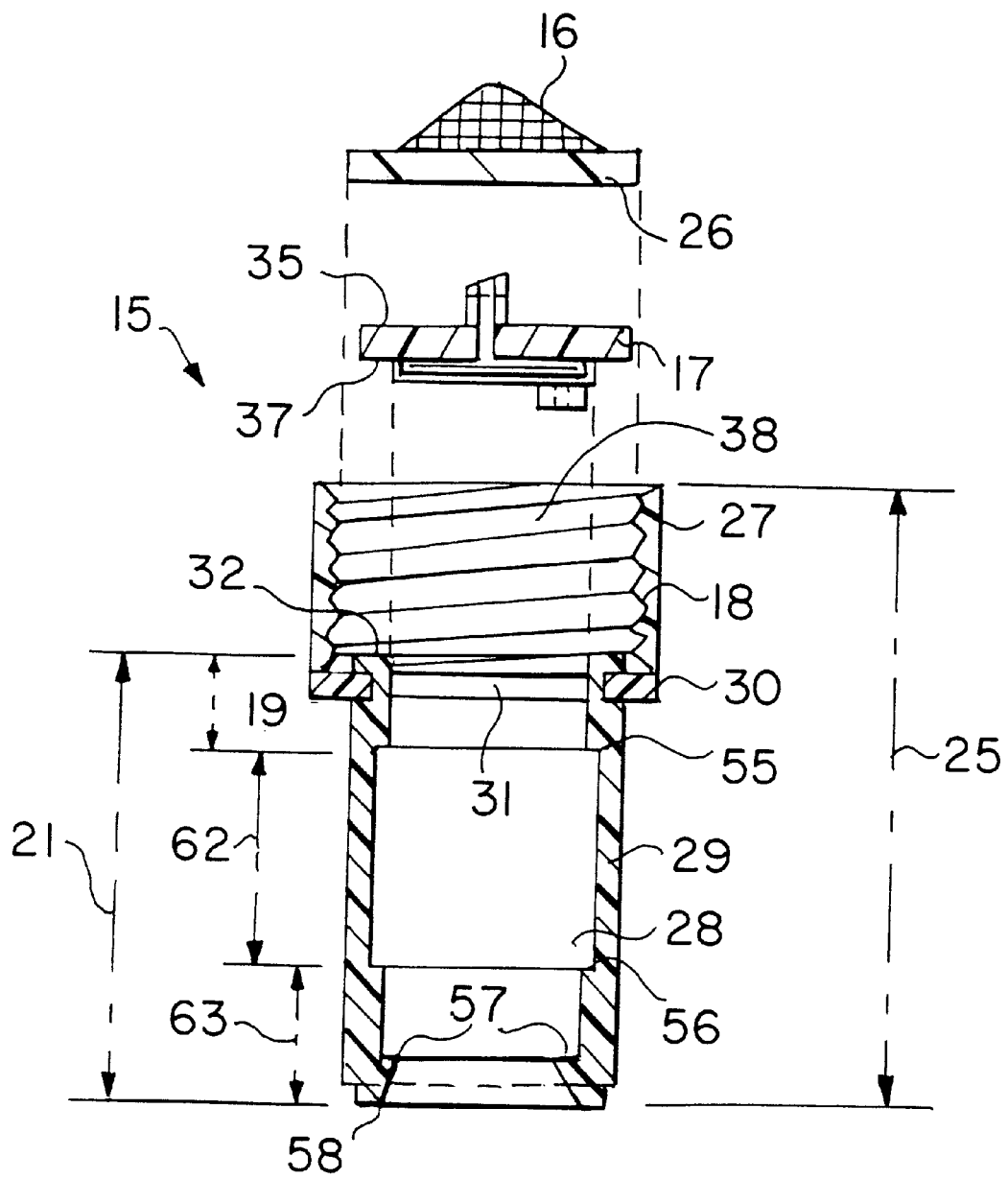
FIG. 2 is a cross sectional view of the dripper device shown in FIG. 1.

As perhaps best shown in FIG. 2, screen 16 has a mesh-like surface with perforations that are preferably smaller than particles in the water so that the particles will not pass through the screen. A washer 26 is attached around the bottom end of the screen 16. The washer 26 is preferably made of plastic-like material and has a substantially annular shape. The center of the washer 26 has an opening to permit the flow of water therethrough.

The screen 16 rests within female member 18, with the upper surface of the washer 26 in abutting relationship with the male end 13 of y-connector 22 and with the lower surface of the washer 26 in abutting relationship with the upper surface 35 of the flow controller 17. Accordingly, a generally fluid-tight seal is created between washer 26 and male end 13 of y-connector 22 and the upper surface 35 of the flow controller 17, when water spigot 10 and y-connector 22 are coupled to each other.

The female member 18 defines a first axial bore 38 in fluid communication with the y-connector 22 at one end and in fluid communication with the upper portion 19 of the elongate member 21 at the opposite end. The longitudinal portion 29 of the elongate member 21 defines a second axial bore 28 connected to the first axial bore 38 and in fluid communication therewith. More specifically, the upper portion 19 of the elongate member 21 has a smaller diameter than longitudinal portion 29 and female member 18, so that the upper portion 19 can fit within female member 18 and defines a controller seat 32 for flow controller 17 to rest thereon.

A groove 31 at the upper portion 19 of the elongate member 21 surrounds its outer surface for receiving a lip 30 defined by the lower edge of female member 18. Such an interlocking relationship maintains the female member in a rotating engagement with elongate member 21.

Downstream of the flow controller seat 32, the longitudinal portion 29 of the elongate member 21 has a first shoulder 55. Such a shoulder extends outward in a substantially perpendicular direction towards the outer wall of the longitudinal portion 29. Thus, the diameter of the second axial bore 28 is increased generally in the mid-portion 62 thereof.

Downstream the mid-portion 62, the longitudinal portion 29 has a second shoulder 56. Such a shoulder extends inward in a substantially perpendicular direction toward the center of the longitudinal portion 29. As a result, a lower portion 63 of the longitudinal portion 29 has a smaller diameter than the diameter of the mid-portion and generally equal to the diameter of the upper portion 19.

Downstream the lower portion 63 is a third shoulder 57. Such a shoulder extends inward in a substantially perpendicular direction toward the center of the longitudinal portion 29 and extends therefrom downward at an angled direction toward the outer wall of the longitudinal portion 29. Such a shoulder 57 extends downstream the lower portion 63 to the end 58 of the longitudinal portion 29. The end 58 defines the opening of the longitudinal portion 29 and water drains therethrough. Because the angled shoulder 57 extends outward, the opening has a diameter approximately equal to the diameter of the lower portion 63.

Shoulder 57 helps secure a poly-drip hose (not shown), for example, within the longitudinal portion 29. Of course, such a poly-drip hose should have a diameter similar to that of the upper and lower portions 19, 63, but larger than the inner diameter between shoulder 57 so that the outer wall of the poly-drip hose and the inner wall of such a shoulder maintain frictional contact therebetween.

Figure 4:
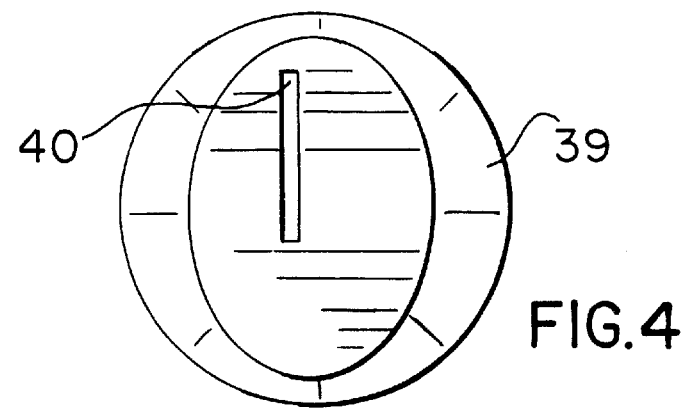
FIG. 4 is a top elevation view showing a slotted opening at the upper inlet of the flow controller shown in FIG. 3.
Figure 3:
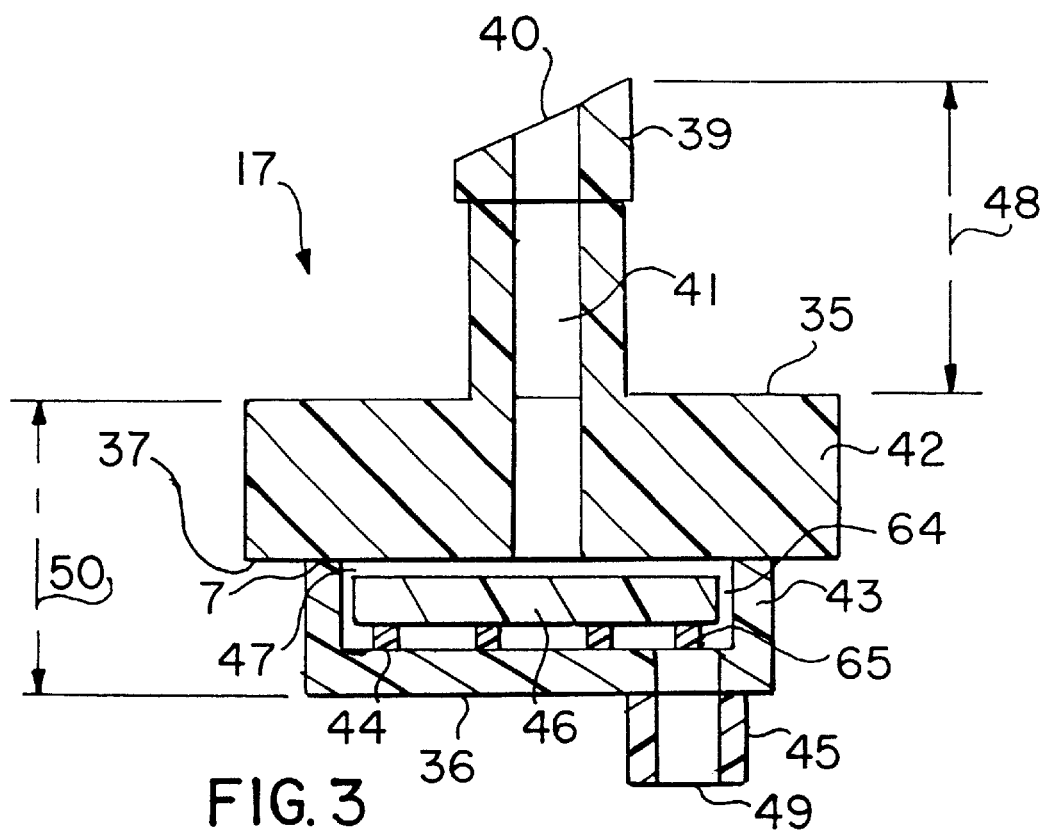
FIG. 3 is an enlarged cross-sectional view of the flow controller housed by the dripper device shown in FIG. 1.

Now referring to FIGS. 3 and 4, the flow controller 17 is normally biased or rests on a controller seat 32 within female member 18, directly below the filter screen 16 and annular washer 26. The upper portion 19 of elongate member 21 forms the controller seat 32. The flow controller 17 is secured against controller seat 32 by securely engaging the female member 18 onto the male end 13 so that the washer 26 becomes compressed between the male end 13 and the upper surface 35 of the upper portion 42 of the housing 50. Such a tight relationship compresses the lower surface 37 of the upper portion 42 against controller seat 32 and provides a fluid-tight seal.

The flow controller 17 includes a housing 50, an upper inlet 48 for receiving a first flow rate of water from a spigot, a cavity 47 defined within the housing 50 and in fluid contact with the upper inlet 48, a flexible membrane 46 housed within the cavity 47 for regulating the first flow rate of water and a lower outlet 45 in fluid contact with the cavity 47 for receiving and discharging a second flow rate of water therefrom which is substantially equal to a first flow rate of water entering the upper inlet 48.

The housing 50 includes an upwardly extending tube with its upper end defining the upper inlet 48. The upwardly extending tube is positioned generally centrally of upper portion 42. The housing 50 also includes a downwardly extending tube with its lower end defining the lower outlet 45. The downwardly extending tube is positioned generally at a perimeter of the lower portion 43.

Upper inlet 48 and lower outlet 45, both extend in generally vertical directions away from upper and lower surfaces 35, 36, respectively. In particular, the upper inlet 48 extends from substantially the center of upper surface 35 and has a cylindrical cavity 41 with a generally conical tip 39. The conical tip is angled and is slotted or has a narrow opening 40 at its top surface for serving as a secondary filter, for example. The upper inlet extends axially downward to its cylindrical cavity 41.

The lower outlet 45 extends from substantially a perimeter of the lower surface 36 of cavity 47. The opening 49 of the lower outlet 45 has a cylindrical cross-section extending axially through its body up to the lower portion 43 of flow controller 17.

Situated between the upper inlet 48 and lower outlet 45, are upper and lower portions, 42, 43, respectively, which define cavity 47. Such upper and lower portions 42, 43 are in fluid communication with each other, wherein the body 41 of the upper inlet 48 extends through the upper portion 42 and opens into lower portion 43. The upper portion 42 has a larger diameter and cross-section than the lower portion 43, with its lower surface 37 defining the upper surface 7 of the lower portion 43.

To control the flow of water through the cavity 47, a flexible membrane 46 is located therein and on a plurality of protrusions 44 extending from the lower inside surface of lower portion 43 into cavity 47. The plurality of protrusions 44 are generally rectangular and are spaced evenly within cavity 47. In the embodiment shown, the flexible membrane 46 is a generally flat disc of resilient material such as rubber or the like, for example. The thickness of membrane should be appropriate so that sufficient water is able to flow through the flow controller 17 to insure that the water in the pipes does not freeze when the ambient temperature is below freezing.

Since usually only a small stream of water is sufficient to insure against freezing, the membrane 46 is not so thin to cause large gaps within the cavity 47 and waste water. Likewise the openings 40, 49 in the upper and lower outlets, respectively, are such that a minimal amount of water may flow therethrough for preventing freezing in the pipes.

In operation, water is allowed to flow into the upper inlet 48, down through its body 41, past thru upper portion 42, into lower portion 43 and directly onto the top surface of flexible membrane 46 in cavity 47. As water enters the cavity, the open spaces 64 between the inner walls of the cavity and the flexible membrane 46 allow water to pass therethrough and out of the lower outlet 45.

Such open spaces are formed between the flexible membrane 46 and the lower surface of upper portion 42 and allow a small stream of water to travel therethrough, down the edge 64 of membrane 46 and out through lower outlet 45 to be deposited into the environment. Because the openings of the upper inlet 48 and lower outlet 45 are generally equal, the flow rates of water entering and leaving the flow controller 17 are generally equal to each other, and sufficient to prevent the water spigot 10 and its respective pipes from freezing during low temperatures.

While the invention has been described with respect to certain specific embodiments, it will be appreciated that many modifications and changes may be made by those skilled in the art without departing from the spirit and scope of the invention. It is intended, therefore, by the appended claims to cover all such modifications and changes as fall within the true spirit and scope of the invention.

What is claimed as new and what it is desired to secure by Letters Patent of the United States is:

1. A dripper apparatus for a water spigot comprising:
    a coupler having a fluid inlet portion and an outlet portion and a continuously open fluid passageway between said inlet and outlet portions for providing continuous water flow from said inlet portion through said outlet portion, said inlet portion including
        a threaded female member for connecting to a water spigot, said female member defining a first axial bore, said outlet portion including;
            a generally cylindrical elongate member having a longitudinal portion defining a second axial bore in fluid communication with said first axial bore, said elongate member having an upper portion with a diameter smaller than a diameter of said first axial bore so that said upper portion defines a seat within said first axial bore;
            a flow controller having a single inlet fluid passageway with said passageway being substantially reduced in size in relation to said axial bores, said flow controller being located in said first axial bore seated on said seat and maintained in said upper portion, when said female member is removably connected to a water spigot.

2. The dripper apparatus of claim 1, wherein said female member includes a lower lip and said elongate member includes a first groove extending around an outer surface of said upper portion for receiving said lip so that said female member may rotate about said groove.

3. The dripper apparatus of claim 1, wherein said longitudinal portion further includes a lower portion having a generally equal diameter to said upper portion, said lower and upper portions connected via a mid-portion having a larger diameter than said diameters of said upper and lower portions for forming first and second spaced shoulders adjacent respective top and bottom ends of said mid-portion.

4. The dripper apparatus of claim 3, wherein said lower portion further includes an annular shoulder adjacent its lower free end to help secure a poly-drip hose so that water can be directed away from said controller.

5. The dripper apparatus of claim 3, wherein said lower portion of said longitudinal portion further includes an angular shoulder to receive and secure a poly-drip hose so that water can be directed away from said controller.

6. The dripper apparatus of claim 3, wherein said controller has a diameter larger than the diameter of said upper portion of said longitudinal portion so that said controller remains within said female section.

7. The dripper apparatus of claim 1, wherein said controller includes
    a housing;
    said inlet passageway extending into said housing and receiving a first flow rate of water from a spigot;
    a cavity defined within said housing and in fluid contact with said upper inlet passageway;
    a flexible membrane housed within said cavity for regulating said first flow rate of water; and
    a lower outlet passageway in said housing in fluid contact with said cavity for receiving and discharging a second flow rate of water therefrom which is substantially equal to a first flow rate of water entering said upper inlet passageway.

8. The dripper apparatus of claim 7, wherein said cavity has an upper portion and a lower portion in fluid communication therebetween; said flexible membrane being disposed between said upper and lower portions of said cavity.

9. The dripper apparatus of claim 8, wherein said flexible membrane has a generally circular shape and a diameter that is smaller than a diameter of said cavity.

10. The dripper apparatus of claim 8, wherein said lower portion includes a plurality of protrusions extending upward from a lower surface thereof, said plurality of protrusions being spaced apart and causing said flexible membrane to float when water enters said cavity via said upper inlet passageway.

11. The dripper apparatus of claim 8, wherein said housing includes an upwardly extending tube with its upper end defining said upper inlet passageway, said upwardly extending tube being positioned generally centrally of said upper portion.

12. The dripper apparatus of claim 11, wherein said upwardly extending tube is generally cylindrical.

13. The dripper apparatus of claim 8, wherein said housing includes a downwardly extending tube with its lower end defining said lower outlet passageway, said downwardly extending tube being positioned generally at a perimeter of said lower portion.

14. The dripper apparatus of claim 13, wherein said downwardly extending tube is generally cylindrical.

15. The dripper apparatus of claim 9, wherein said flexible membrane is formed of a rubber-like material.

16. The dripper apparatus of claim 7, wherein said upper inlet passageway and said lower outlet passageway each define openings receiving and discharging fluid, respectively.

17. The dripper apparatus of claim 16, wherein said opening of said upper inlet passageway is slotted for serving as a secondary filter thereby preventing foreign particles from entering said flow controller.

18. The dripper apparatus of claim 1, wherein said filter screen includes a washer attached around a lower end thereof against which a spigot is removably sealed.

19. A dripper apparatus for a water spigot comprising:
    a coupler having a fluid inlet portion and an outlet portion and a continuously open fluid passageway between said inlet and outlet portions for providing continuous water flow from said inlet portion through said outlet portion, said inlet portion including
        a threaded female member for connecting to a water spigot, said female member defining a first axial bore, said outlet portion including
            a generally cylindrical elongate member having a longitudinal portion defining a second axial bore in fluid communication with said first axial bore, said elongate member having an upper portion with a diameter smaller than a diameter of said first axial bore so that said upper portion defines a seat within said first axial bore;

a flow controller in said first axial bore seated on said seat and maintained in said upper portion, when said female member is removably connected to a water spigot;

said flow controller including a housing and a flexible membrane disposed within said housing, said housing having an outlet and an inlet substantially smaller in size than said axial bores; and a particle filter located upstream of said controller.

20. The dripper apparatus as defined in claim 19, wherein said female member includes a lower lip and said elongate member includes a first groove extending around an outer surface of said upper portion for receiving said lip so that said female member may rotate about said groove.

* * * * *